US012061438B2

(12) United States Patent
Wang et al.

(10) Patent No.: US 12,061,438 B2
(45) Date of Patent: Aug. 13, 2024

(54) DRUM UNIT CAPABLE OF SUPPRESSING COMPLICATION OF WIRING

(71) Applicant: BROTHER KOGYO KABUSHIKI KAISHA, Nagoya (JP)

(72) Inventors: Yuwen Wang, Nagoya (JP); Takuya Amaike, Iwakura (JP); Junichi Hashimoto, Toyohashi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/685,654

(22) Filed: Mar. 3, 2022

(65) Prior Publication Data

US 2022/0187760 A1 Jun. 16, 2022

Related U.S. Application Data

(63) Continuation of application No. 17/212,449, filed on Mar. 25, 2021, now Pat. No. 11,269,292.

(30) Foreign Application Priority Data

Apr. 1, 2020 (JP) ................................ 2020-066237

(51) Int. Cl.
*G03G 21/18* (2006.01)
*G03G 15/08* (2006.01)
*G03G 15/09* (2006.01)

(52) U.S. Cl.
CPC ..... *G03G 21/1867* (2013.01); *G03G 15/0856* (2013.01); *G03G 15/0921* (2013.01)

(58) Field of Classification Search
CPC ....... G03G 21/1867; G03G 2221/1823; G03G 2221/1684
See application file for complete search history.

(56) References Cited

U.S. PATENT DOCUMENTS 7,343,122 B2 * 3/2008 Itagaki ................. G03G 15/065 399/270
7,657,670 B2 * 2/2010 Funamizu .............. G03G 15/50 710/316

(Continued)

FOREIGN PATENT DOCUMENTS

JP 08297436 A * 11/1996
JP 11-242371 A 9/1999

(Continued)

OTHER PUBLICATIONS

International Search Report and Written Opinion issued in corresponding International Patent Application No. PCT/JP2021/012704, May 25, 2021.

(Continued)

*Primary Examiner* — Leon W Rhodes, Jr.
(74) *Attorney, Agent, or Firm* — Merchant & Gould P.C.

(57) ABSTRACT

A drum unit includes a photosensitive drum, a developing unit, a toner cartridge, a connector and a relay board. The photosensitive drum is rotatable about a first axis extending in an axial direction. The developing unit includes a magnetic roller, a developer container, a conveyer member and a toner sensor. The developer container accommodates therein carrier, and has an inlet. The conveyer member is positioned in the developer container, and configured to convey toner and the carrier from the inlet toward the magnetic roller. The toner cartridge accommodates therein toner and is attachable to the developer container to replenish toner in the developer container through the inlet. The connector is electrically connected to an image forming apparatus. The relay board electrically connects the toner sensor to the connector. The relay board is configured to transmit a detection signal from the toner sensor to the image forming apparatus.

16 Claims, 8 Drawing Sheets

(56) References Cited

U.S. PATENT DOCUMENTS

| | | | | |
|---|---|---|---|---|
| 7,840,160 | B2 * | 11/2010 | Shimomura | G03G 21/1676 399/119 |
| 8,219,007 | B2 * | 7/2012 | Murauchi | G03G 15/0893 399/256 |
| 9,645,538 | B2 | 5/2017 | Watanabe et al. | |
| 10,761,459 | B2 | 9/2020 | Kishi | |
| 11,061,359 | B2 | 7/2021 | Abe et al. | |
| 11,269,292 | B2 * | 3/2022 | Wang | G03G 15/0856 |
| 11,287,242 | B2 * | 3/2022 | Jansen | G01B 9/02072 |
| 11,409,225 | B2 * | 8/2022 | Kawaguchi | G03G 21/1652 |
| 11,487,242 | B2 * | 11/2022 | Abe | G03G 21/1814 |
| 2001/0014225 | A1 | 8/2001 | Otsubo et al. | |
| 2005/0036802 | A1 * | 2/2005 | Saito | G03G 21/1609 399/119 |
| 2013/0236197 | A1 | 9/2013 | Yoshida et al. | |
| 2018/0129161 | A1 | 5/2018 | Kim | |
| 2019/0041792 | A1 * | 2/2019 | Kishi | G03G 21/1623 |
| 2021/0096498 | A1 | 4/2021 | Sugiura et al. | |

FOREIGN PATENT DOCUMENTS

| | | | |
|---|---|---|---|
| JP | 2005-215293 | A | 8/2005 |
| JP | 2006-171105 | A | 6/2006 |
| JP | 2013-61629 | A | 4/2013 |
| JP | 2014-170155 | A | 9/2014 |
| JP | 2019-28345 | A | 2/2019 |
| JP | 2020-38240 | A | 3/2020 |

OTHER PUBLICATIONS

Office Action issued in corresponding Japanese Patent Application No. 2020-066237, Feb. 13, 2024.

Office Action (Notice of Reasons for Refusal) issued in corresponding Japanese Patent Application No. 2020-066237, Nov. 21, 2023.

* cited by examiner

DRUM UNIT CAPABLE OF SUPPRESSING COMPLICATION OF WIRING

CROSS REFERENCE TO RELATED APPLICATION

This application is a continuation of U.S. patent application Ser. No. 17/212,449, filed Mar. 25, 2021, now U.S. Pat. No. 11,269,292, which claims priority from Japanese Patent Application No. 2020-066237 filed Apr. 1, 2020. The entire content of the priority applications is incorporated herein by reference.

TECHNICAL FIELD

The present disclosure relates to a drum unit configured to be attached to and detached from a housing of an image forming apparatus.

BACKGROUND

Conventionally, there has been known an image forming apparatus including a housing, a drum unit, and a toner cartridge as described in Japanese Patent Application Publication No. 2006-171105. The toner cartridge is attachable to and detachable from the housing. The drum unit is attachable to and detachable from the housing independent of the toner cartridge. The drum unit includes a developer container accommodating therein carrier. The housing is provided with a toner replenishing device for replenishing toner in the toner cartridge to the developer container.

SUMMARY

A toner sensor may be provided in the drum unit to detect an amount of toner in the developer container. In such a case, an electrical connection between the toner sensor and the image forming apparatus is required for transmitting a detection signal from the toner sensor to the image forming apparatus. However, direct electrical connection between the toner sensor and the image forming apparatus may lead to complication of wiring in the drum unit.

In view of the foregoing, it is an object of the present disclosure to provide a drum unit capable of suppressing the complication of wiring.

In order to attain the above and other objects, according to one aspect, the disclosure provides a drum unit attachable to and detachable from an image forming apparatus. The drum unit includes a photosensitive drum, a developing unit, a toner cartridge, a connector and a relay board. The photosensitive drum is rotatable about a first axis extending in an axial direction. The developing unit includes a magnetic roller, a developer container, a conveyer member and a toner sensor. The magnetic roller is rotatable about a second axis extending in the axial direction, and configured to supply toner to the photosensitive drum. The developer container accommodates therein carrier, and has an inlet. The conveyer member is positioned in the developer container, and configured to convey toner and the carrier from the inlet toward the magnetic roller. The toner sensor is configured to detect an amount of toner in the developer container. The toner cartridge accommodates therein toner and is attachable to the developer container to replenish the toner in the developer container through the inlet. The connector is electrically connected to the image forming apparatus in response to attachment of the drum unit to the image forming apparatus. The relay board electrically connects the toner sensor to the connector. The relay board is configured to transmit a detection signal from the toner sensor to the image forming apparatus.

BRIEF DESCRIPTION OF THE DRAWINGS

The particular features and advantages of the disclosure will become apparent from the following description taken in connection with the accompanying drawings, in which.

DETAILED DESCRIPTION

Figure 1:
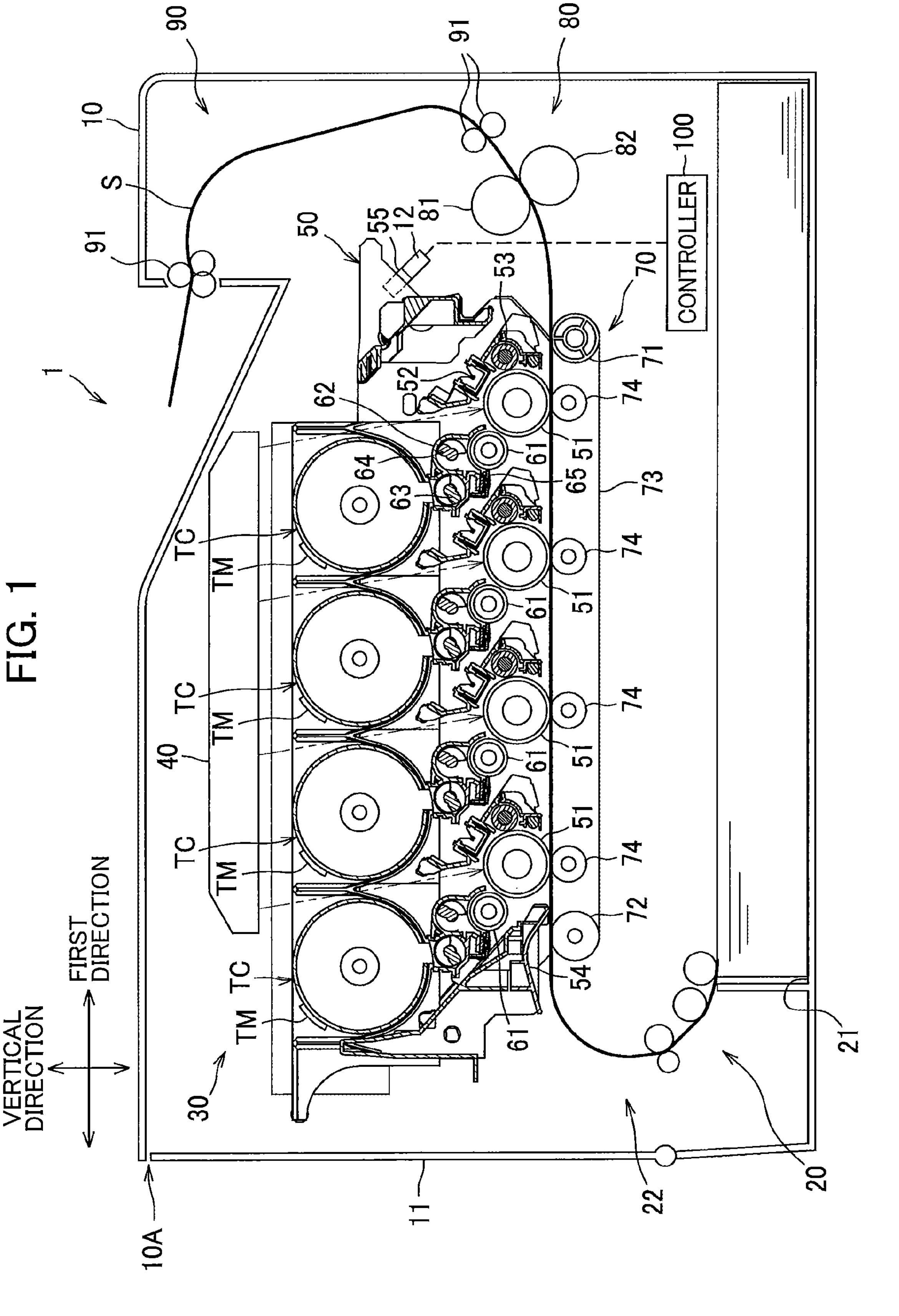
FIG. 1 is a cross-sectional view of a color printer including a drum unit according to one embodiment of the present disclosure.

Hereinafter, a drum unit according to one embodiment of the present disclosure will be described with reference to the accompanying drawings. Firstly, an overall structure of a color printer 1 as an example of an image forming apparatus to which the drum unit is applied will be described with reference to FIG. 1. The color printer 1 includes a housing 10, a sheet supply unit 20, an image forming unit 30, a discharge unit 90, and a controller 100.

The housing 10 has an opening 10A and includes a front cover 11 and a built-in connector 12. The front cover 11 is movable between an open position where the front cover 11 opens the opening 10A and a closed position where the front cover 11 closes the opening 10A. Specifically, the front cover 11 is pivotally movable between the open position and the closed position. The built-in connector 12 is positioned inside the housing 10. The built-in connector 12 is electrically connected to the controller 100.

The sheet supply unit 20 includes a supply tray 21, and a sheet feed mechanism 22. The supply tray 21 is configured to store a stack of sheets S. The sheet feed mechanism 22 is configured to convey the sheet S to the image forming unit 30 from the supply tray 21. A heavy paper, a postcard, and a thin paper are available as the sheet S.

The image forming unit 30 includes a scanner unit 40, a drum unit 50, a transfer unit 70, and a fixing unit 80.

The scanner unit 40 includes a laser emitting portion, a polygon mirror, lenses and reflection mirrors those not illustrated.

The drum unit 50 is movable in a first direction relative to the housing 10 through the opening 10A.

Specifically, the drum unit 50 is movable in the first direction between an accommodated position where the drum unit 50 is accommodated in the housing 10 and a pulled-out position where the drum unit 50 is pulled out of the housing 10. That is, the drum unit 50 is attachable to and detachable from the housing 10 of the color printer 1.

Figure 2:
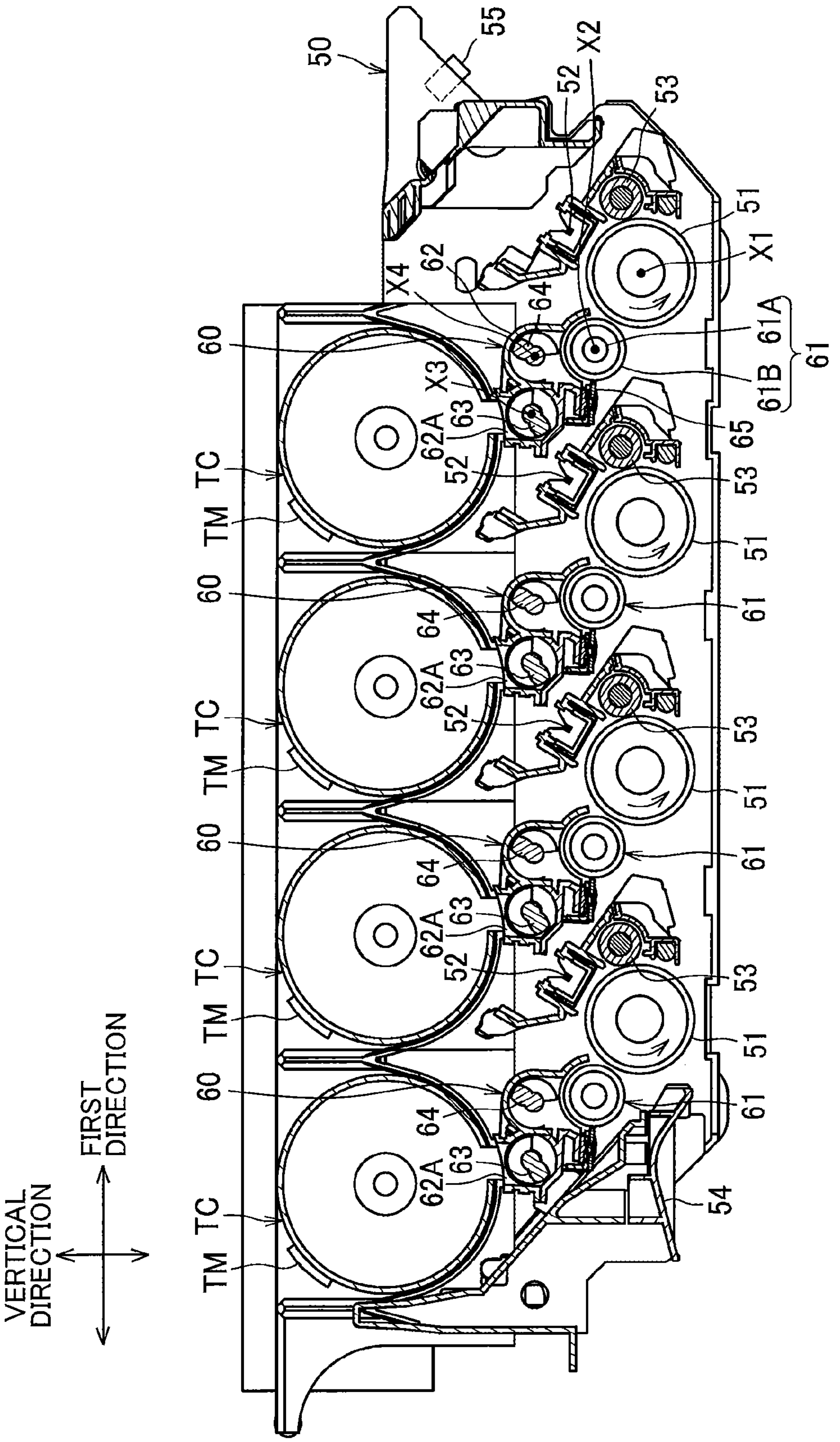
FIG. 2 is a cross-sectional view of the drum unit to which toner cartridges are attached.

As illustrated in FIG. 2, the drum unit 50 includes a plurality of photosensitive drums 51, and a plurality of developing units 60. Specifically, the drum unit 50 includes four photosensitive drums 51, four scorotron chargers 52, four cleaning rollers 53, four developing units 60, four toner cartridges TC, a sheet guide 54, and a connector 55. The above-described scanner unit 40 is configured to irradiate a laser beam to the photosensitive drums 51.

Figure 3:
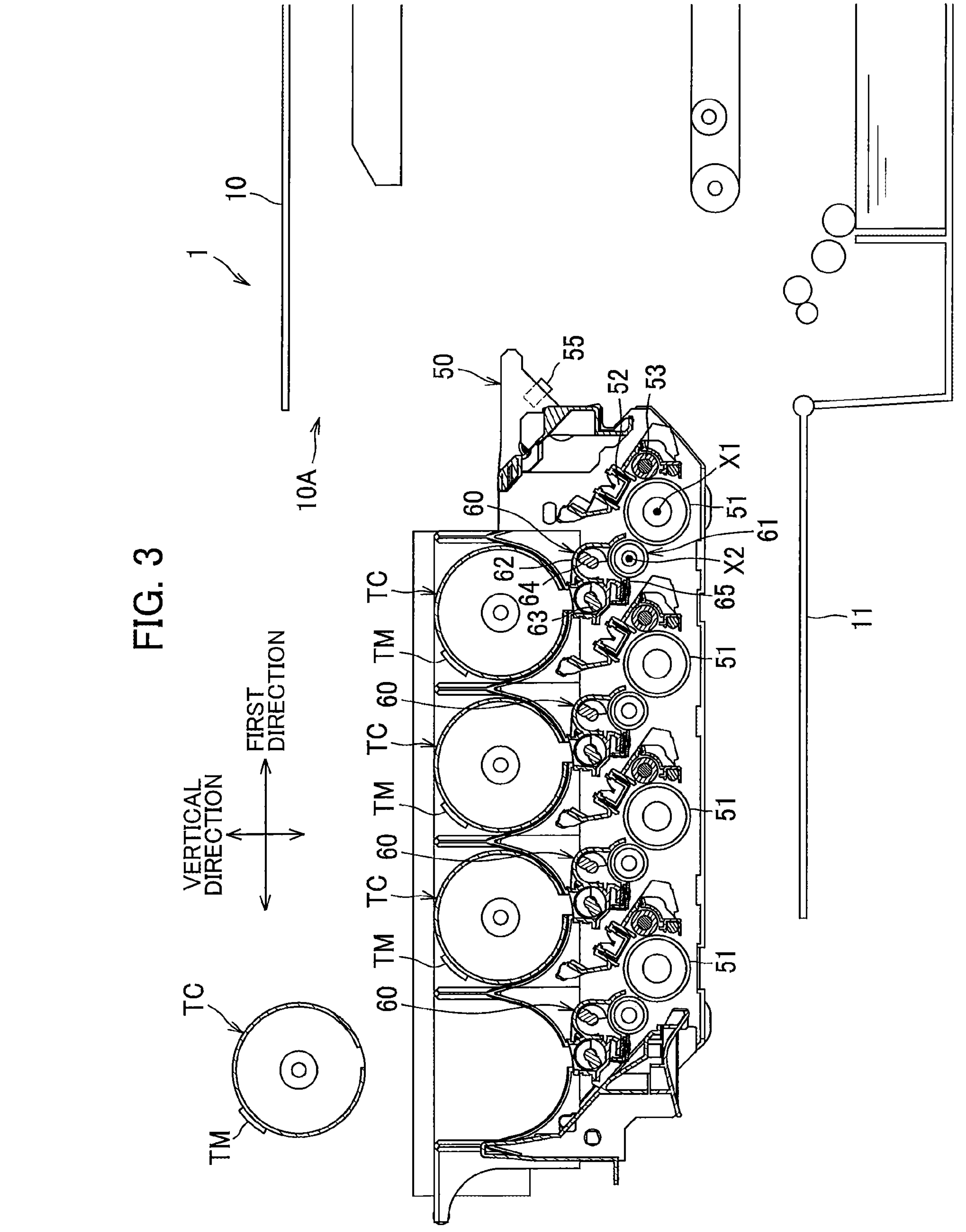
FIG. 3 is a cross-sectional view of the drum unit positioned at a pulled-out position.

The toner cartridge TC is configured to accommodate therein toner which is non-magnetic material. As illustrated in FIG. 3, the four toner cartridges TC are attachable to and detachable from a frame of the drum unit 50. Specifically, each toner cartridge TC is attachable to and detachable from the frame of the drum unit 50 in a direction perpendicular to an axial direction of the photosensitive drum 51. The frame of the drum unit 50 will be described later with reference to FIG. 6.

The photosensitive drum 51 is rotatable about a first axis X1 extending in the axial direction. The axial direction crosses the first direction, and specifically, the axial direction is perpendicular to the first direction. The four photosensitive drums 51 are arrayed one after another in the first direction.

The scorotron charger 52 is configured to charge the photosensitive drum 51. Incidentally, a charge roller may be employed instead of the scorotron charger 52. The cleaning roller 53 is configured to perform cleaning on the photosensitive drum 51. Incidentally, a cleaning blade may be employed instead of the cleaning rollers 53.

The four developing units 60 are arrayed one after another in the first direction. Each developing unit 60 is positioned between each toner cartridge TC and each photosensitive drum 51. The developing unit 60 includes a magnetic roller 61, a developer container 62, a first auger 63, a second auger 64, and a layer thickness regulation blade 65. The first auger 63 and the second auger 64 are an example of a conveyor member.

The magnetic roller 61 is configured to supply toner to the photosensitive drum 51. The magnetic roller 61 includes a magnetic shaft 61A and a magnetic sleeve 61B. The magnetic shaft 61A has alternating magnetic poles with a predetermined pattern in a circumferential direction thereof. The magnetic shaft 61A is a solid cylindrical member in which a plurality of permanent magnets are embedded. The magnetic shaft 61A is fixed to the developer container 62.

The magnetic sleeve 61B is a hollow cylindrical member made from non-magnetic metal as main component. The magnetic sleeve 61B is rotatable about the magnetic shaft 61A. The magnetic sleeve 61B retains toner by magnetic force of the magnetic shaft 61A.

The magnetic roller 61 is positioned between the toner cartridge TC and the photosensitive drum 51. The magnetic sleeve 61B is rotatable about a second axis X2 extending in the axial direction. The magnetic roller 61 faces the surface of the photosensitive drum 51. The magnetic roller 61 is separated from the surface of the photosensitive drum 51.

The developer container 62 is configured to accommodate carrier which is magnetic material. Iron powder is an example of the carrier. The developer container 62 has an inlet 62A through which toner is replenished from the toner cartridge TC. The inlet 62A is positioned opposite to the magnetic roller 61 with respect to the first auger 63 and the second auger 64. The above described toner cartridge TC is attached to the developer container 62 in accordance with the attachment of the toner cartridge TC to the frame of the drum unit 50.

Figure 4A:
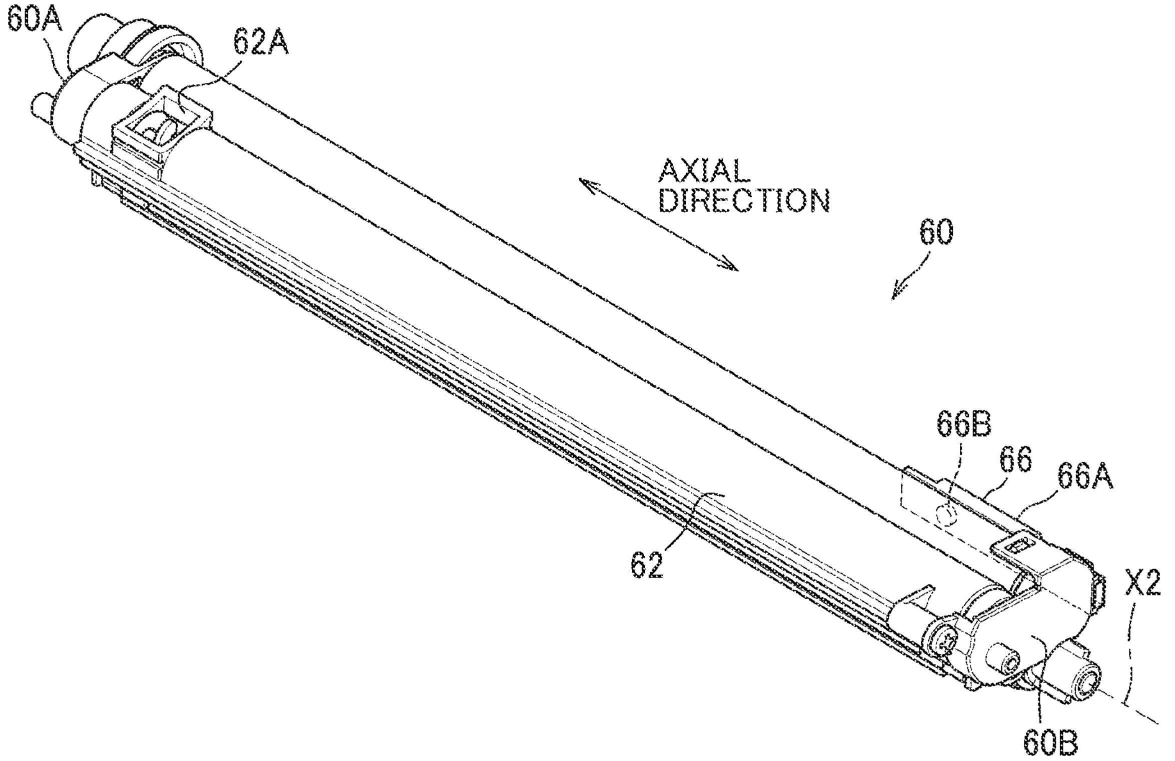
FIG. 4A is a perspective view of a developing unit.
Figure 4B:
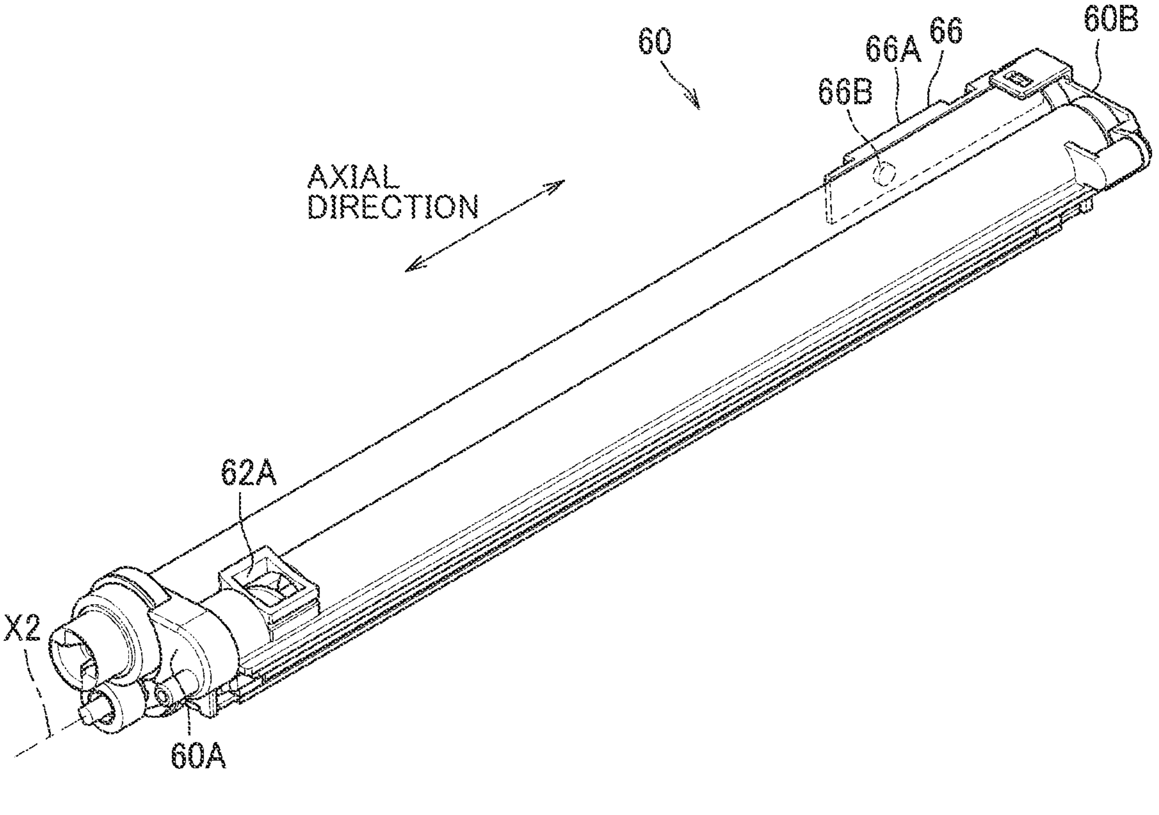
FIG. 4B is another perspective view of the developing unit.

The inlet 62A is positioned above the first auger 63 and the second auger 64. Specifically, the inlet 62A is positioned vertically above the first auger 63. The second axis X2 is positioned below the first auger 63 and the second auger 64. Specifically, the second axis X2 is positioned vertically below the second auger 64. Toner can be replenished to the developer container 62 through the inlet 62A upon attachment of the toner cartridge TC to the developer container 62. As illustrated in FIGS. 4A and 4B, the inlet 62A is positioned at one end portion in the axial direction of the developer container 62.

As illustrated in FIG. 2, the first auger 63 and the second auger 64 are positioned in the developer container 62. The first auger 63 is rotatable about a third axis X3 extending in the axial direction. The second auger 64 is rotatable about a fourth axis X4 extending in the axial direction. The first auger 63 and the second auger 64 are arrayed with each other in the first direction. The first auger 63 is positioned closer to the inlet 62A than the second auger 64 is to the inlet 62A.

The layer thickness regulation blade 65 is configured to regulate a thickness of a toner layer formed on the magnetic roller 61. The layer thickness regulation blade 65 is out of contact with the magnetic roller 61. The layer thickness regulation blade 65 is positioned below the first auger 63 and the second auger 64. Specifically, the layer thickness regulation blade 65 is positioned vertically below the first auger 63.

The layer thickness regulation blade 65 is arrayed with the magnetic roller 61 in the first direction. The second axis X2 is positioned between the layer thickness regulation blade 65 and the first axis X1 in the first direction.

A toner memory TM is provided at the toner cartridge TC. The toner memory TM is configured to store therein information on each toner cartridge TC. The information contains at least one of identification information for distinguishing one toner cartridge from another toner cartridge, and lifetime information about toner in each toner cartridge TC. A serial number is an example of the identification information. One of cumulative rotation number of the magnetic roller 61, cumulative rotation number of the first auger 63, dot count of formed image, and residual amount of toner can be the lifetime information. The toner memory TM may be configured to store therein additional information.

The sheet guide 54 is configured to guide the sheet S toward the photosensitive drums 51. The sheet guide 54 is arrayed with the photosensitive drums 51 in the first direction. The sheet guide 54 is positioned at an upstream side of the four photosensitive drums 51 in a conveying direction of the sheet S.

The magnetic roller 61 positioned at a most upstream side in the sheet conveying direction among the four magnetic rollers 61 is positioned between the sheet guide 54 and the second auger 64. Further, each of the four magnetic rollers 61 is positioned between the sheet guide 54 and the first and second augers 63, 64 in a vertical direction perpendicular to the first and axial directions. The layer thickness regulation blade 65 positioned at a most upstream side in the sheet conveying direction among the four layer thickness regulation blades 65 is positioned between the sheet guide 54 and the first auger 63. Further, each of the four layer thickness regulation blades 65 is positioned between the sheet guide 54 and the first and second augers 63, 64 in the vertical direction.

The connector 55 is positioned at an outer surface of the drum unit 50. Specifically, the connector 55 is positioned at the outer surface of the frame of the drum unit 50 supporting the developing unit 60.

As illustrated in FIG. 1, the transfer unit 70 is configured to transfer toner images on the photosensitive drums 51 to the sheet S. The transfer unit 70 is positioned between the sheet supply unit 20 and the drum unit 50. The transfer unit 70 includes a drive roller 71, a follower roller 72, a conveyer belt 73, and transfer rollers 74.

The drive roller 71 and the follower roller 72 are spaced away from each other in the first direction. The conveyer belt 73 is an endless belt looped over the drive roller 71 and the follower roller 72. The transfer rollers 74 are positioned in a space encircled by the conveyer belt 73. The conveyer belt 73 is nipped between the photosensitive drums 51 and the transfer rollers 74. The conveyer belt 73 is an example of a transfer member.

The fixing unit 80 includes a heat roller 81 and a pressure roller 82. The sheet S is nipped between the heat roller 81 and the pressure roller 82. The discharge unit 90 includes a plurality of discharge rollers 91.

In the image forming unit 30, the scorotron charger 52 charges the surfaces of the photosensitive drum 51, and thereafter, the scanner unit 40 irradiates a laser beam to the surface of the photosensitive drum 51, whereupon an electrostatic latent image is formed on the surface of the photosensitive drum 51.

The toner cartridge TC replenishes toner to the interior of the developer container 62. The first auger 63 conveys toner and carrier in the developer container 62 to the second auger 64. The second auger 64 supplies toner to the magnetic roller 61. The magnetic roller 61 supplies toner to the electrostatic latent image formed on the surface of the photosensitive drum 51. Hence, a toner image is formed on the photosensitive drum 51.

The conveyer belt 73 conveys the sheet S, so that the sheet S moves through a portion between the photosensitive drums 51 and the transfer rollers 74. At this time, each toner image formed on each photosensitive drum 51 is successively transferred onto the sheet S. Then, the sheet S passes through a portion between the heat roller 81 and the pressure roller 82. At this time, the toner image on the sheet S is thermally fixed to the sheet S. Then, the conveyer rollers 91 conveys the sheet S to a position outside the housing 10.

The controller 100 includes CPU, RAM, ROM, and input/output circuit. The controller 100 performs arithmetic processing to control operation of the color printer 1 on a basis of information on the attached cartridge and programs and data those stored in the ROM.

As illustrated in FIG. 1, the connector 55 is electrically connected to the color printer 1 when the drum unit 50 is attached to the color printer 1. Specifically, in a case where the drum unit 50 is attached to the housing 10, the connector 55 is in contact with the built-in connector 12. Further, in the case where the drum unit 50 is attached to the housing 10, the connector 55 is electrically connected to the built-in connector 12. Information on toner cartridge TC can be transmitted from the toner memory TM to the controller 100, or data can be transmitted from the controller 100 to the toner memory TM for writing data in the toner memory TM, upon electrical connection of the connector 55 to the built-in connector 12 in a state of attachment of the toner memory TM to the drum unit 50.

As illustrated in FIGS. 4A and 4B, a toner sensor 66 is provided at the developing unit 60. The toner sensor 66 is attached to each of the plurality of developing unit 60. The above-described toner memory TM may be configured to further store information detected by the toner sensor 66.

The toner sensor 66 is positioned opposite to the inlet 62A in the axial direction. Specifically, the toner sensor 66 is positioned at another end portion in the axial direction of the developer container 62. The other end portion is opposite to the one end portion of the developer container 62 where the inlet 62A is positioned.

Figure 5:
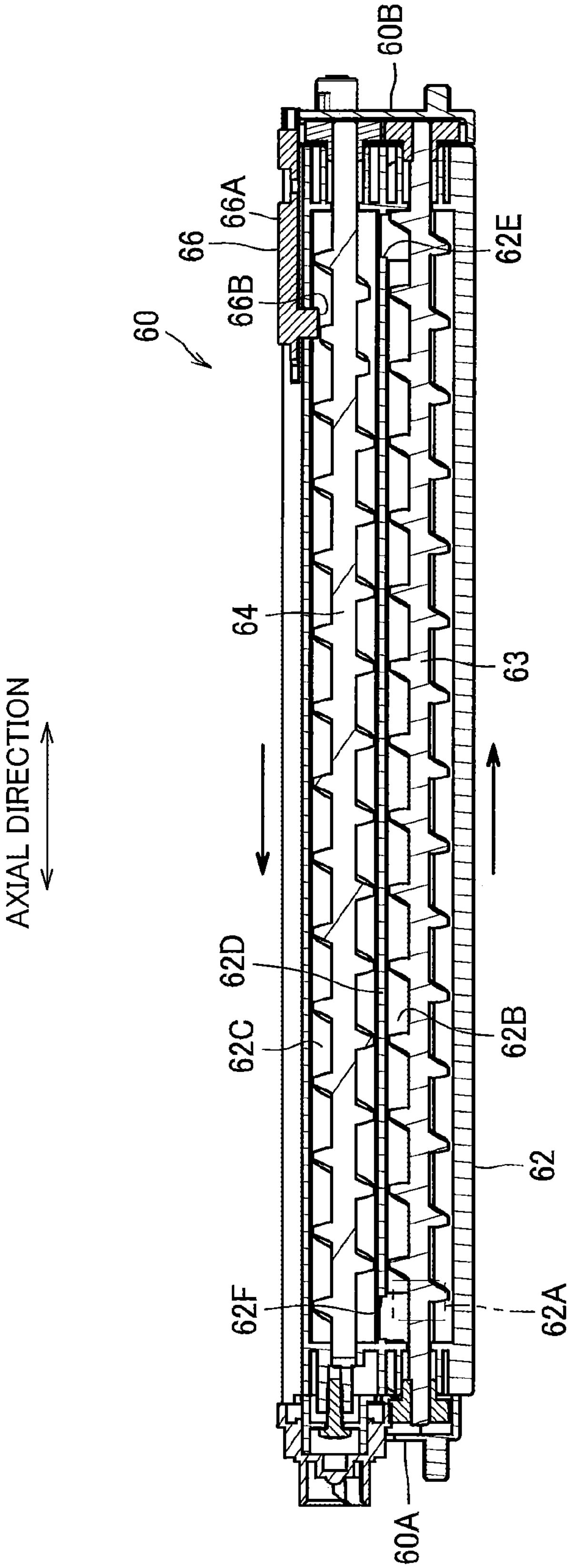
FIG. 5 is a cross-sectional view of the developing unit.

The toner sensor 66 is configured to detect an amount of toner in the developer container 62. In the present embodiment, the toner sensor 66 is a magnetic sensor capable of detecting magnetic permeability. The toner sensor 66 includes a body part 66A and a detection part 66B. As illustrated in FIG. 5, the body part 66A is positioned at an outer side of the developer container 62. The detection part 66B is inserted in a hole of the developer container 62 to contact the toner and carrier accommodated in the developer container 62. The detection part 66B has a disc shape. The detection part 66B is configured to detect magnetic permeability. Signals detected by the toner sensor 66 are transmitted to the controller 100. Hence, the controller 100 determines an amount of toner in the developer container 62 on a basis of the detection signal.

The developer container 62 includes a first accommodation chamber 62B, a second accommodation chamber 62C, and a partition wall 62D, and is formed with a supply opening 62E, and a recovery opening 62F. The first accommodation chamber 62B defines an internal space in which the first auger 63 is accommodated. The second accommodation chamber 62C defines an internal space in which the second auger 64 is accommodated. Toner and carrier are accommodated in the first accommodation chamber 62B and the second accommodation chamber 62C.

The partition wall 62D partitions the developer container 62 into the first accommodation chamber 62B and the second accommodation chamber 62C. The supply opening 62E is positioned at one end of the partition wall 62D in the axial direction. The supply opening 62E allows the first accommodation chamber 62B and the second accommodation chamber 62C to communicate with each other. The supply opening 62E permits the toner and the carrier to move from the first accommodation chamber 62B to the second accommodation chamber 62C.

The recovery opening 62F is positioned at another end of the partition wall 62D in the axial direction. The recovery opening 62F allows the first accommodation chamber 62B and the second accommodation chamber 62C to communicate with each other. The supply opening 62E permits the toner and the carrier to move from the second accommodation chamber 62C to the first accommodation chamber 62B.

The inlet 62A is open to the first accommodation chamber 62B. A distance from the inlet 62A to the supply opening 62E is greater than a distance from the inlet 62A to the recovery opening 62F.

The first auger 63 is configured to convey the toner and the carrier in a direction from one end 60A toward another end 60B of the developer container 62 in the axial direction. Specifically, the first auger 63 is configured to convey the toner replenished into the first accommodation chamber 62B through the inlet 62A to the supply opening 62E along with the carrier.

The second auger 64 is configured to convey the toner and the carrier in a direction from another end 60B to the one end 60A of the developer container 62. Specifically, the second auger 64 is configured to convey the toner supplied into the second accommodation chamber 62C through the supply opening 62E toward the one end 60A. The toner and the carrier conveyed in the axial direction by the second auger 64 is attracted to the surface of the magnetic roller 61 because of the magnetic force thereof. The toner and the carrier conveyed to the recovery opening 62F is moved to the first accommodation chamber 62B through the recovery opening 62F.

In this manner, the first auger 63 and the second auger 64 conveys the toner and the carrier from the inlet 62A to the magnetic roller 61. Further, the first auger 63 and the second auger 64 perform circulation of the toner and the carrier in the developer container 62.

Figure 6:
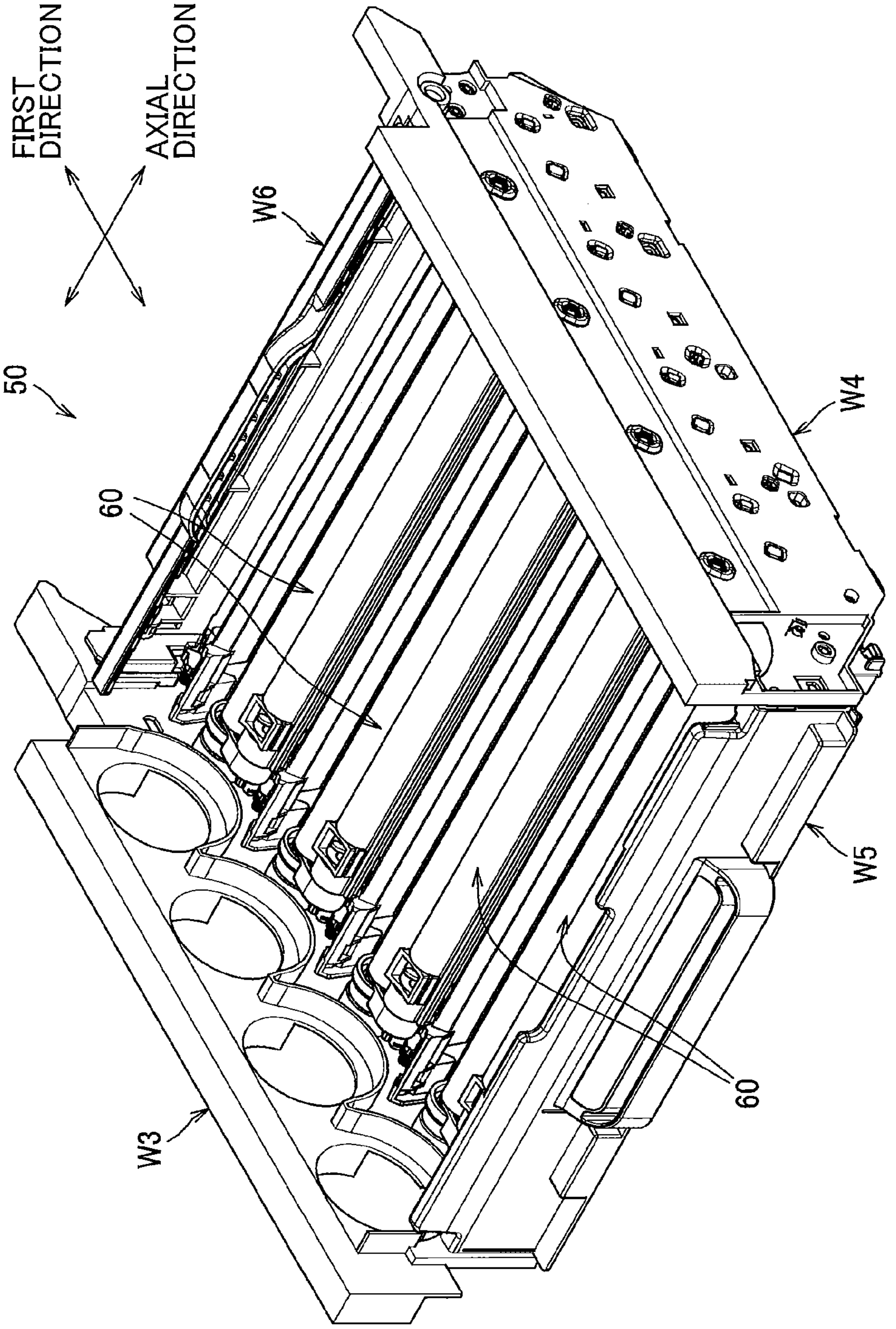
FIG. 6 is a perspective view of the drum unit according to the embodiment.

As illustrated in FIG. 6, the frame of the drum unit 50 supporting the photosensitive drums 51 and the developing units 60 includes a first side wall W3, a second side wall W4, a front wall W5, and a rear wall W6. The frame is configured to support the photosensitive drum 51 and the developing unit 60. These walls W3, W4, W5, W6 are made from resin.

Each developing unit 60 is positioned between the first side wall W3 and the second side wall W4 in the axial direction. The front wall W5 spans between one end portion in the first direction of the first side wall W3 and one end portion in the first direction of the second side wall W4. The rear wall W6 spans between another end portion in the first direction of the first side wall W3 and another end portion in the first direction of the second side wall W4. The connector 55 is positioned at the outer surface of the rear wall W6.

Figure 7:
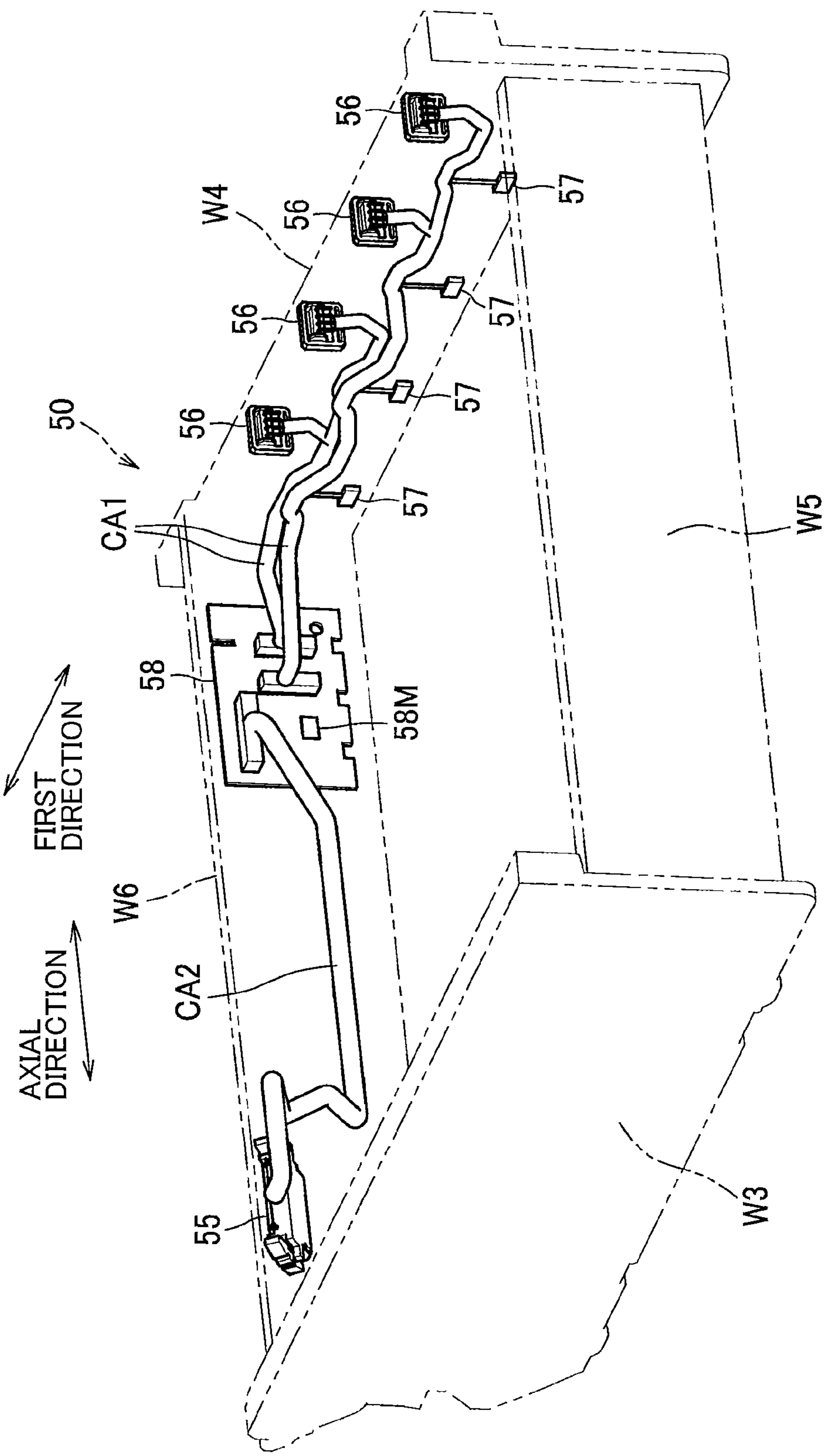
FIG. 7 is a perspective view particularly illustrating a wiring in the drum unit according to the embodiment.

As illustrated in FIG. 7, the drum unit 50 further includes a plurality of first electrical contacts 56, a plurality of second electrical contacts 57, a relay board 58, first cables CA1, and a second cable CA2.

Figure 8:
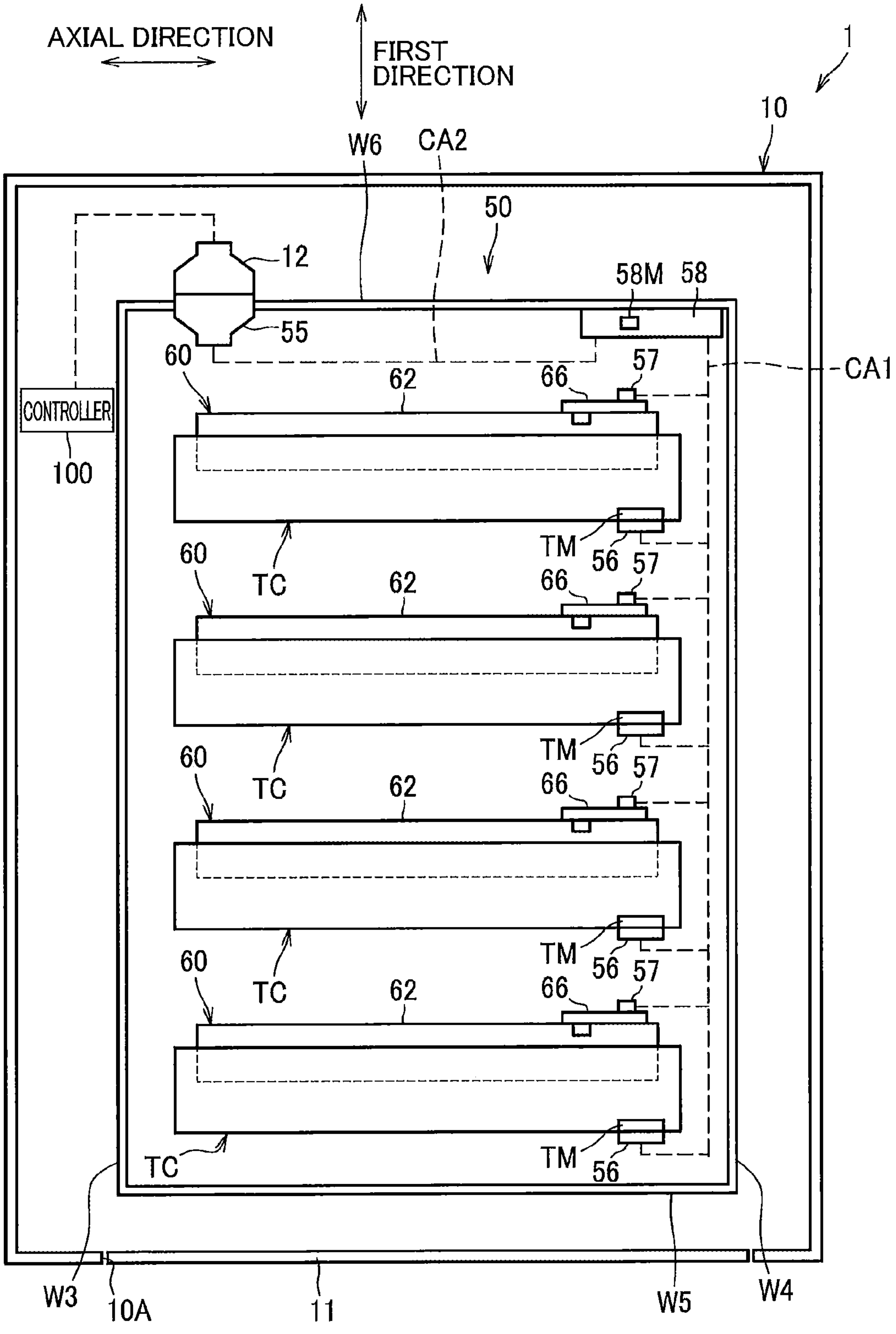
FIG. 8 is a top plan view of the color printer for description of relative positions of toner sensors, a relay board, a built-in connector, and a controller.

Each first electrical contact 56 is one-to-one correspondence with each toner memory TM. The plurality of first electrical contacts 56 are positioned on an inner surface of the second side wall W4 and are arrayed with each other in the first direction. As illustrated in FIG. 8, the first electrical contact 56 contacts the toner memory TM and is electrically connected thereto in a case where the toner cartridge TC is attached to the drum unit 50 and the drum unit 50 is attached to the housing 10.

Each second electrical contact 57 is one-to one correspondence with each toner sensor 66. The plurality of second electrical contacts 57 are positioned on the inner surface of the second side wall W4 and are arrayed with each other in the first direction. The second electrical contact 57 contacts an output terminal of the toner sensor 66 and is electrically connected thereto as a result of attachment of the drum unit 50 to the housing 10.

The relay board 58 is positioned on an inner surface of the rear wall W6. The relay board 58 includes a drum memory 58M configured to store therein drum unit information on the drum unit 50. The relay board 58 is electrically connected to the first electrical contacts 56 and the second electrical contacts 57 by the first cables CA1. The relay board 58 is also electrically connected to the connector 55 by the second cable CA2.

The relay board 58 is configured to electrically connect each toner sensor 66 to the connector 55. The relay board 58 is also configured to electrically connect each toner memory TM to the connector 55. The drum memory 58M is electrically connected to the connector 55 by the second cable CA2. The drum memory 58M may be configured to store therein information detected by the toner sensor 66. The drum memory 58M may be configured to store therein a value about calibration.

At least one of identification information for discrimination of the drum unit 50 and a lifetime information on the photosensitive drum 51 is an example of the drum unit information. A serial number is one of the examples of the identification information. At least one of cumulative rotation number of the photosensitive drum 51, cumulative number of printing sheets using the photosensitive drum 51, and cumulative number of dot count using the photosensitive drum 51 is an example of the information about lifetime of the photosensitive drum 51.

A signal detected by the toner sensor 66 is transmitted to the controller 100 of the color printer 1 through the relay board 58. Further, the information on the toner cartridge stored in the toner memory TM is transmitted to the controller 100.

The drum unit 50 according to the present embodiment can provide an advantageous effect described below. In the drum unit 50, the toner sensor 66 transmits the detection signal to the color printer 1 through the relay board 58. Hence, the electric wiring from the relay board 58 to the connector 55 and other wirings can be lumped together. As a result, complicated wirings in the drum unit 50 can be eliminated.

Further, the relay board 58 performs relaying for electrical connection of the connector 55 to the toner memory TM, so that information stored in the toner memory TM can be transmitted to the controller 100. Hence, a detection signal from the toner sensor 66 and the toner cartridge information stored in the toner memory TM can be collected in the relay board 58 and transmitted from the connector 55 to the controller 100.

Further, the relay board 58 performs relating for electrical connection of the connector 55 to the drum memory 58M, so that the information stored in the drum memory 58M can be transmitted to the controller 100. Hence, a detection signal from the toner sensor 66 and the drum unit information stored in the drum memory 58M can be collected in the relay board 58 and transmitted from the connector 55 to the controller 100.

Further, the inlet 62A of the developing unit 60 and the toner sensor 66 are positioned at the one end portion and another end portion in the axial direction of the developer container 62, respectively. Hence, the inlet 62A and the toner sensor 66 are distant from each other by a predetermined distance. If the toner sensor 66 is positioned excessively close to the inlet 62A, accurate detection of the amount of toner in the developer container 62 may not be attained due to insufficient dispersion of the toner replenished through the inlet 62A into the developer container 62. The sufficient distance between the inlet 62A and the toner sensor 66 can provide stabilized detection of the toner amount.

Further, each toner sensor 66 of each developing unit 60 is connected to the relay board 58. Therefore, detection signals from the respective toner sensors 66 can be collected in the relay board 58, and transmitted from the connector 55 to the controller 100.

Various modifications may be conceivable. For example, the first direction is perpendicular to the axial direction. However, the first direction may be directed in parallel to the axial direction.

In the above-described embodiment, the toner sensor is the magnetic sensor in which magnetic permeability is detectable. However, a physical sensor for detecting amount of toner or agitation torque and an optical sensor for detecting light transmitting through the toner or for detecting reflection light are also available as the toner sensor.

The drum unit according to the above-described embodiment is applied to the color printer 1. However, the drum unit 50 may be applied to an image recording apparatus other than the color printer 1, such as a monochromatic printer, a copying machine, and a multifunction peripheral.

In the above-described embodiment, the heavy paper, the postcard, and the thin paper are available as the sheet S. However, an OHP sheet is also available as the sheet S.

In the above-described disclosure, the conveyer belt 73 is exemplified as the transfer member. However, transfer rollers contacting the photosensitive drums 51 may be available as the transfer member.

While the description has been made in detail with reference to the specific embodiment and modifications, it would be apparent to those skilled in the art that various changes and modifications may be made without departing from the scope and spirit of the disclosure.

What is claimed is:

1. A drum unit comprising:
- a frame:
- a first photosensitive drum rotatable about a first axis extending in an axial direction, the first photosensitive drum being supported by the frame;
- a first magnetic roller rotatable about a second axis extending in the axial direction, the first magnetic roller being configured to supply toner to the first photosensitive drum;
- a first container accommodating therein carrier and toner;
- a second photosensitive drum rotatable about a third axis extending in the axial direction, the second photosensitive drum being supported by the frame;
- a second magnetic roller rotatable about a fourth axis extending in the axial direction, the second magnetic roller being configured to supply toner to the second photosensitive drum;
- a second container accommodating therein carrier and toner; and
- a drum memory configured to store therein information related to the drum unit.

2. The drum unit according to claim 1, further comprising a connector configured to be electrically connected to an image forming apparatus in response to attachment of the drum unit to the image forming apparatus.

3. The drum unit according to claim 2, wherein the drum memory is electrically connected to the connector.

4. The drum unit according to claim 3, further comprising:
- a first toner sensor configured to detect an amount of toner accommodated in the first container; and
- a second toner sensor configured to detect an amount of toner accommodated in the second container.

5. The drum unit according to claim 4, further comprising:
- a relay board electrically connecting each of the first toner sensor and the second toner sensor to the connector, the relay board being configured to transmit a detection signal from the first toner sensor to the image forming apparatus and to transmit a detection signal from the second toner sensor to the image forming apparatus.

6. The drum unit according to claim 5, wherein the drum memory is configured to store therein both of information detected by the first toner sensor and information detected by the second toner sensor.

7. The drum unit according to claim 4,
- wherein the first container further includes a first toner inlet, the first container having one end portion in the axial direction where the first toner inlet is positioned and having another end portion in the axial direction where the first toner sensor is positioned.

8. The drum unit according to claim 1,
- wherein the frame includes:
  - a first side wall supporting both of one end of the first photosensitive drum and one end of the second photosensitive drum; and
  - a second side wall spaced apart from the first side wall in the axial direction, the second side wall supporting both of another end of the first photosensitive drum and another end of the second photosensitive drum.

9. The drum unit according to claim 4, wherein the first toner sensor is a magnetic sensor configured to detect magnetic permeability.

10. The drum unit according to claim 1, further comprising:
- a first auger configured to convey the toner and the carrier accommodated in the first container in a direction from one end to another end in the axial direction of the first container;
- a second auger configured to convey the toner and the carrier accommodated in the first container in a direction from the another end to the one end in the axial direction of the first container;
- a third auger configured to convey the toner and the carrier accommodated in the second container in a direction from one end to another end in the axial direction of the second container; and
- a fourth auger configured to convey the toner and the carrier accommodated in the second container in a direction from the another end to the one end in the axial direction of the second container.

11. The drum unit according to claim 1, wherein the first magnetic roller includes:
- a magnetic shaft having permanent magnets; and
- a magnetic sleeve rotatable about the second axis.

12. An image forming apparatus comprising:
- a housing;
- the drum unit according to claim 1, the drum unit being attachable to and detachable from the housing;
- a first toner cartridge accommodating toner therein; and
- a second toner cartridge accommodating toner therein.

13. The image forming apparatus according to claim 12,
- wherein the first toner cartridge includes a first toner memory configured to store therein information related to the first toner cartridge, and
- wherein the second toner cartridge includes a second toner memory configured to store therein information related to the second toner cartridge.

14. The image forming apparatus according to claim 13, further comprising a first connector positioned inside the housing,
- wherein the drum unit further comprises:
  - a second connector which is configured to be electrically connected to the first connector in response to attachment of the drum unit to the housing; and
  - a relay board configured to perform relaying for electrical connection of the second connector to the first toner memory to transmit the information stored in the first toner memory to the first connector.

15. The image forming apparatus according to claim 12,
- wherein the first container has a first toner inlet,
- wherein the second container has a second toner inlet,
- wherein the first toner cartridge is attachable to the first container to replenish the toner to the first container through the first toner inlet, and
- wherein the second toner cartridge is attachable to the second container to replenish the toner to the second container through the second toner inlet.

16. An image forming apparatus comprising:
- a housing having an opening;
- a cover movable between an open position, where the cover opens the opening, and a closed position, where the cover closes the opening;

a controller;

a connector positioned inside the housing, the connector being electrically connected to the controller;

a drum unit comprising:

a frame;

a first photosensitive drum rotatable about a first axis extending in an axial direction, the first photosensitive drum being supported by the frame;

a first magnetic roller rotatable about a second axis extending in the axial direction, the first magnetic roller being configured to supply toner to the first photosensitive drum;

a first container accommodating therein carrier, the first container having a first toner inlet;

a second photosensitive drum rotatable about a third axis extending in the axial direction, the second photosensitive drum being supported by the frame;

a second magnetic roller rotatable about a fourth axis extending in the axial direction, the second magnetic roller being configured to supply toner to the second photosensitive drum; and a second container accommodating therein carrier, the second container having a second toner inlet;

a first toner cartridge accommodating therein toner, the first toner cartridge being configured to replenish the toner to the first container through the first toner inlet; and a second toner cartridge accommodating therein toner, the second toner cartridge being configured to replenish the toner to the second container through the second toner inlet, wherein in the state where the cover is positioned at the closed position, the connector is positioned farther from the cover than the first toner cartridge is from the cover.

* * * * *